United States Patent [19]

Stephens et al.

[11] Patent Number: 4,558,929
[45] Date of Patent: Dec. 17, 1985

[54] NON-FOGGING MIRROR

[76] Inventors: John A. Stephens; Martin Stephens, both of 95 Rochester St., Sydney, New South Wales, Australia

[21] Appl. No.: 574,074

[22] Filed: Jan. 26, 1984

[51] Int. Cl.$^4$ .............................................. G02B 7/18
[52] U.S. Cl. .................................................... 350/588
[58] Field of Search ......................................... 350/588

[56] References Cited

U.S. PATENT DOCUMENTS

| 3,708,218 | 1/1973 | Smillie, III | 350/588 |
| 4,150,869 | 4/1979 | Hansen | 350/588 |
| 4,327,961 | 5/1982 | Kladitis | 350/588 |

FOREIGN PATENT DOCUMENTS

| 32753 | 3/1977 | Japan | 350/588 |
| 1490373 | 12/1974 | United Kingdom . |
| 2110529 | 7/1981 | United Kingdom . |

Primary Examiner—William H. Punter
Attorney, Agent, or Firm—Howson and Howson

[57] ABSTRACT

A non-foggable mirror assembly for use in a shower comprises a mirror mounted on a unitary frame. The frame is recessed to provide a space between the back surface of the mirror and the frame. This space serves as a chamber for hot water, which is fed through a port at the bottom of the chamber, and which exits through a continuously open port at the top of the chamber. The bottom port is connected to an adapter for connection to a water pipe leading to a shower head for tapping off heated water. The heated water passes upwardly through the chamber continuously, heating the mirror, and preventing condensation.

2 Claims, 5 Drawing Figures

NON-FOGGING MIRROR

This invention relates to non-fogging mirrors and in particular to non-fogging mirrors for use in bathrooms and shower recesses.

It is well known that moisture will condense on any cold surface and if that surface is a mirror, the condensed moisture will make the mirror non-reflective. Before the mirror can be used to assist in shaving, it is necessary that it be wiped down with a cloth to remove the condensed moisture thereon. Even this procedure is ineffective if the room is still filled with steam as secondary condensation will occur.

The present invention seeks to overcome, or at least substantially alleviate the above disadvantages.

In its broadest aspect, the invention provides a non-foggable mirror which comprises a reflective surface, a back surface, a chamber in heat exchange relationship with substantially the entire said back surface, whereby when heated water flows through said chamber, the said reflective surface is heated to prevent fogging.

The present invention will now be described with reference to the attached drawings in which.

Figure 1:
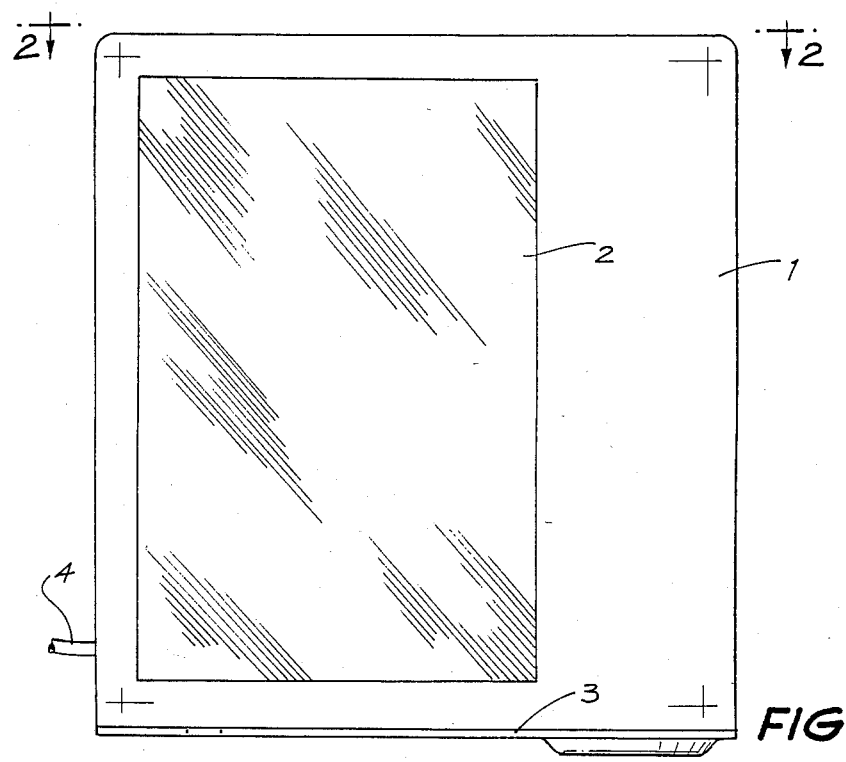
FIG. 1 is a front elevation of a preferred embodiment of the present invention.
Figure 2:
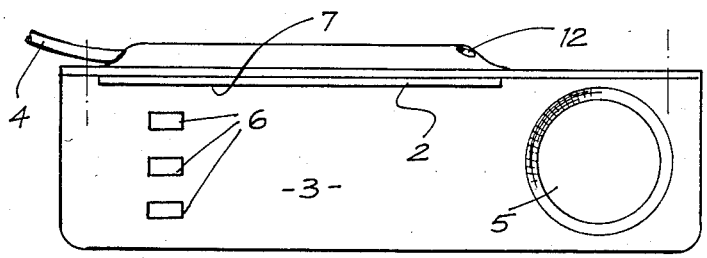
FIG. 2 is a plan view on the line 2—2 of FIG. 1.
Figure 3:
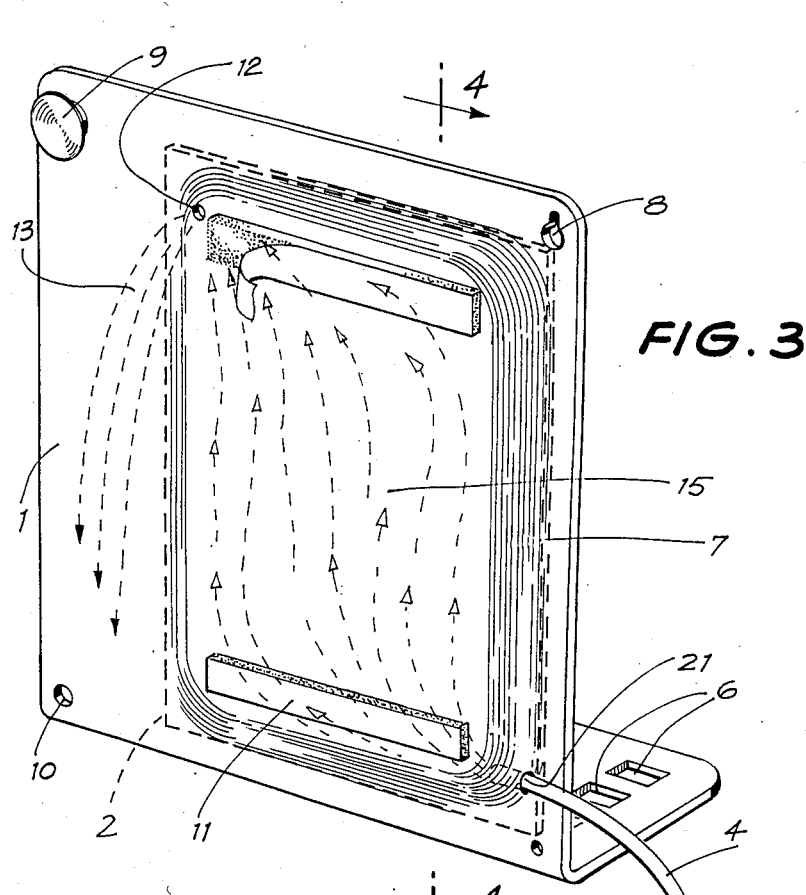
FIG. 3 is a rear perspective view of the embodiment of FIG. 1.
Figure 4:
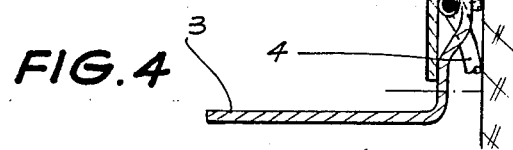
FIG. 4 is a section view on the line 4—4 of FIG. 3.

In FIGS. 1, 2 and 4 the preferred embodiment consists of a plastic mirror 2 having a reflective surface 7 and a back surface 22. The mirror 2 is peripherally attached to a plastic frame 1. Said frame 1 having a recess back portion 15, as shown in FIGS. 3 and 4, with the mirror 2 forming a chamber 16 therebetween.

For convenience the base of frame 1 is in the form of a shelf 3 extending forward thereof, as shown in FIG. 3. In the shelf 3 is a recess 5 for holding shaving cream and holes 6 for holding disposable plastic razors.

Figure 5:
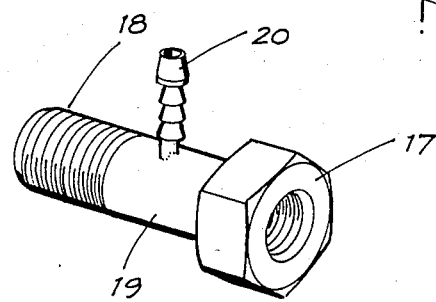
FIG. 5 is a perspective view of an adaptor for use with the embodiment of FIG. 1.

There is shown in FIG. 5 an adaptor for fitting on to a shower outlet pipe. This adaptor 19 has a female end 17, a male end 18 and a spigot branch 20. In Australia, older homes have a male end shower outlet, whereas the newer homes have a female end outlet. Adaptor 19 was specifically designed to meet this problem.

The present invention can be affixed to a wall 14 by any suitable means. As seen in FIG. 3 the attachment may be by way of supporting hooks previously fixed into the wall and over which frame 1 is hung by means of holes 8 conveniently located on the rear of frame 1. Other means of attaching the frame 1 to wall 14 are by double-sided adhesive tape 11, by suction cap 9 or by simply nailing or screwing through hole 10. By way of illustration only the frame 1 is attached to wall 14 by double-sided adhesive tape 11 as shown in FIG. 4.

In operation the adaptor 19 is first affixed to the shower outlet pipe by removing the shower rose (not shown), attaching the adaptor 19 and replacing the shower rose. The free end of inlet pipe 4 is affixed spigot fashion to spigot branch 20 and the frame 1 is attached to the wall 14 of a shower recess by any suitable means and at any convenient height.

When the shower is turned on, some of the warm-hot water bypasses the shower rose and enters the chamber 16 through inlet port 21. The water then circulates throughout chamber 16 before exiting through outlet port 12. From there the water flows down the rear side 13 of frame 1.

By reason of the constantly circulating warm-hot water the reflective surface 7 is heated preventing fogging.

The present invention has been trial tested for twelve months and found to be effective.

The preferred embodiment of the invention is particularly suitable for use in shower recesses where it will enable a person to shower and shave at the same time.

Although this invention has been described in its preferred form with a degree of particularity, the present disclosure has been made by way of example only, for it is to be understood that numerous changes may be made in materials used, in design and construction both of the frame and the water course for example a baffled or coiled chamber could be used; and in the manner of attachment of the frame, without departing from the spirit and scope of the invention as hereinbefore described.

We claim:

1. A non-foggable mirror assembly for use in a shower comprising a mirror having a reflective surface and a back surface; a chamber in heat exchange relationship with substantially the entire said back surface, the chamber having upper and lower ends and having an inlet port at the lower end and a continuously open outlet port at the upper end; adapter means for connection to a water pipe leading to a shower head for tapping off heated water from the water pipe; and means connected between said adapter means and the inlet port for conducting heated water from said adapter means into the chamber through said inlet port, whereby heated water flows upwardly through said chamber from the inlet port to the outlet port, and said reflective surface is continuously heated by the water to prevent fogging.

2. A non-foggable mirror assembly according to claim 1 in which the chamber is constituted by the mirror and a unitary sheet, the sheet having a planar margin area abutting the back surface of the mirror around substantially the entire periphery thereof and a recess surrounded by the margin area and spaced from the back surface of the mirror.

* * * * *